(12) United States Patent
Tsuno et al.

(10) Patent No.: US 8,070,908 B2
(45) Date of Patent: Dec. 6, 2011

(54) (METH)ACRYLIC ADHESIVE WITH LOW ODOR AND HIGH IMPACT RESISTANCE

(75) Inventors: Shingo Tsuno, Chigasaki (JP); Ria De Cooman, Zurich (CH)

(73) Assignee: Sika Technology AG, Baar (CH)

(\*) Notice: Subject to any disclaimer, the term of this patent is extended or adjusted under 35 U.S.C. 154(b) by 497 days.

(21) Appl. No.: 12/113,698

(22) Filed: May 1, 2008

(65) Prior Publication Data

US 2008/0202683 A1     Aug. 28, 2008

Related U.S. Application Data

(63) Continuation of application No. 11/143,460, filed on Jun. 3, 2005, now abandoned.

(30) Foreign Application Priority Data

Jun. 23, 2004 (EP) .................................. 04102919

(51) Int. Cl.
*C09J 133/20* (2006.01)
*C08J 153/00* (2006.01)
(52) U.S. Cl. .................. 156/331.2; 525/98; 525/240
(58) Field of Classification Search ............... 156/331.2; 525/98, 240
See application file for complete search history.

(56) References Cited

U.S. PATENT DOCUMENTS

| | | | | |
|---|---|---|---|---|
| 4,451,615 A | * | 5/1984 | Charnock | ........................ 525/98 |
| 6,433,091 B1 | * | 8/2002 | Cheng | ........................ 525/191 |

FOREIGN PATENT DOCUMENTS

| | | | |
|---|---|---|---|
| WO | WO 02/070620 | * | 9/2002 |
| WO | WO 02/070620 A1 | | 9/2002 |

\* cited by examiner

*Primary Examiner* — Robert D. Harlan
(74) *Attorney, Agent, or Firm* — Oliff & Berridge, PLC

(57) ABSTRACT

The present invention relates to (meth)acrylic adhesives with high impact resistance and no or low odor. The compositions comprise at least a (meth)acrylic ester E which may be obtained by esterification of an alcohol ALC and methacrylic or acrylic acid, said alcohol ALC contains at least 5 carbon atoms; and at least a rubber block co-polymer RS being solid at room temperature and which is a co-polymer of styrene and butadiene and/or isoprene and/or ethylene propylene diene monomer; and at least a polymer PL having pending (meth) acrylic groups and is a butadiene/acrylonitrile co-polymer with terminal (meth)acrylic groups or a polyurethane (meth) acrylate or an ester obtainable by esterification of an alcohol ALC-II and methacrylic or acrylic acid and which has a molecular weight between 200 and 9000 g/mol. Such combinations E-RS-PL have lower viscosity than PL and a combination E-RS.

25 Claims, 1 Drawing Sheet

Figure 1
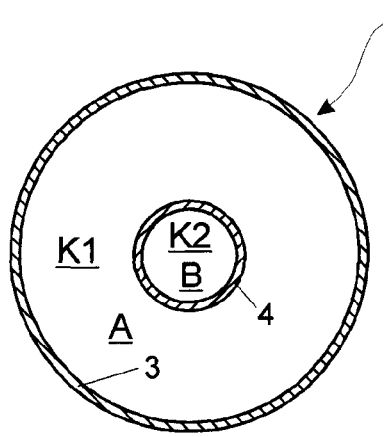
Figure 1a)
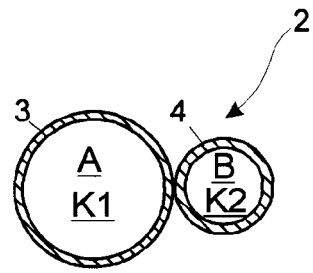
Figure 1b)
Figure 2
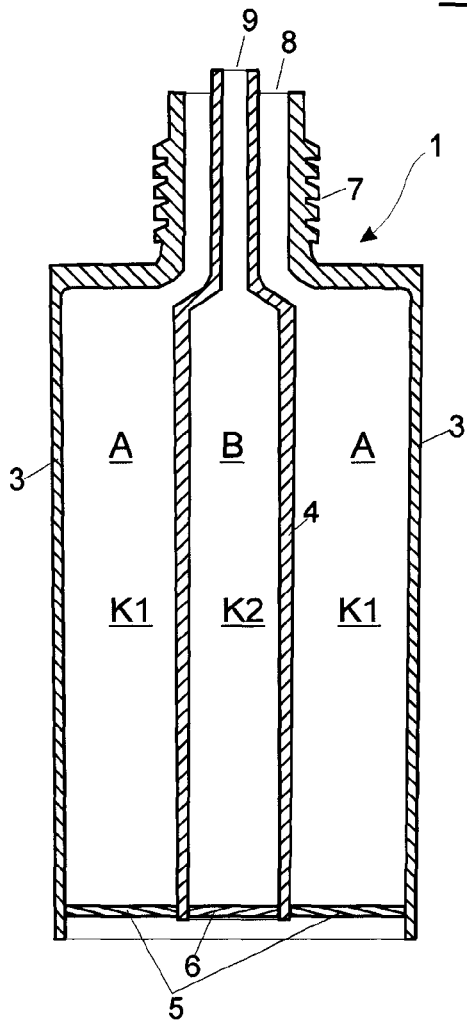
Figure 2a)
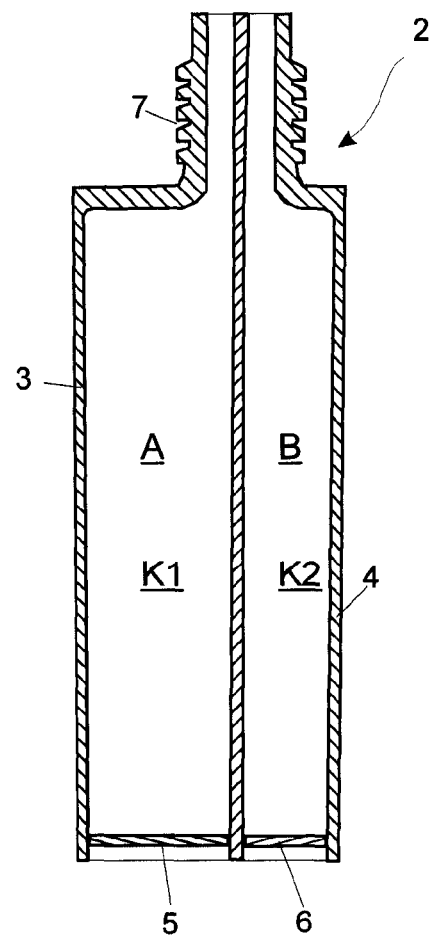
Figure 2b)

# (METH)ACRYLIC ADHESIVE WITH LOW ODOR AND HIGH IMPACT RESISTANCE

This is a Continuation of application Ser. No. 11/143,460 filed Jun. 3, 2005. The disclosure of the prior application is hereby incorporated by reference herein in its entirety.

TECHNICAL FIELD

The invention relates to the field of impact resistant (meth)acrylic adhesives.

STATE OF THE ART

Adhesives based on (meth)acrylic monomers or oligomers are known. Such (meth)acrylic adhesives are usually two component adhesives; one of which comprises a radical initiator, typically a peroxide. The advantage of such adhesives is that they exhibit a fast development of mechanical strength.

Impact resistance is an important material property of structural bonding. Usual (meth)acrylic adhesives suffer from low impact resistance, leading to a break of bonding in case of a sudden impact. However, such impacts occur very often. To increase the impact resistance, the use of solid and liquid rubbers has been know since a long time. Because solid rubbers are known to increase the viscosity of adhesives, only small amounts of solid rubbers may be used. The use of liquid rubber increases the impact resistance, however, only to a limited extend. This problem is the case especially at low temperatures. U.S. Pat. No. 6,433,091 discloses an adhesive composition comprising a polymeric elastomer and a vinyl-terminated liquid rubber. The majority of the monomers disclosed, such as methylmethacrylate, however, exhibit a strong and unpleased odor which limits the fields of application of such compositions.

DESCRIPTION OF THE INVENTION

It is the general object of the present invention to provide a composition which exhibits fast curing, improved impact resistance and strongly reduced or no odor.

Unexpectedly it was found that this was achieved by a composition according to claim 1. The advantage of such a composition is that it comprises a large amount of solid rubber—even in cases where fillers are present—without being too viscous to be applied by conventional application equipments leading to excellent impact resistance and high glass transition temperatures.

Furthermore the composition of invention exhibits very low odor which is very advantageous in that such compositions may be applied also in areas without or only with slight ventilation. Furthermore, the monomers used in the composition of invention possess a higher flash point than methylmethacrylate, what is advantageous regarding transport, handling and storage regulations. Preferably the flash point of the composition is higher than 50° C.

The present invention is a composition which comprises at least one (meth)acrylic ester E, at least a rubber block co-polymer RS and at least a polymer PL having pending (meth)acrylic groups.

In the present document "(meth)acrylate" stands for acrylates, i.e. esters of acrylic acid, as well as for methacrylates, i.e. esters of methacrylic acid.

Said (meth)acrylic ester E is obtainable by esterification of an alcohol ALC and methacrylic or acrylic acid. Said alcohol ALC contains at least 5 carbon atoms. The alcohol is preferably a monool. Further preferred said monool has no further functional group, except of the ether function in certain cases, in its chemical formula. Preferably such alcohol is selected from the group consisting of tetrahydrofurfuryl alcohol, isoborneol, trimethylcyclohexanol and any mixtures thereof. Tetrahydrofurfuryl alcohol is the most preferred alcohol ALC.

The esterification of (meth)acrylic acid with the alcohol ALC is performed by methods known to the person skilled in the art. Also further routes for the synthesis of said (meth)acrylic ester E are possible. For example transesterification of methylmethacrylate or methylacrylate with alcohol ALC in the presence of catalysts also leads to the said (meth)acrylic ester E. The details for such a transesterification are known to the person skilled in the art in this field.

The (meth)acrylic ester E has preferably only one (meth)acrylic group in its chemical formula.

$C_1$- to $C_4$-(meth)acrylates have a high vapor pressure, which results in a strong odor; especially methylmethacrylate, which is commonly used in adhesives, has an extremely unpleasant strong odor which restricts the use of such adhesives. Such limitations are not present with the (meth)acrylic ester E. The choice of the (meth)acrylic ester E is strongly dependent on the properties of the cured adhesives. The (meth)acrylic ester E is typically the main ingredient of the adhesive and is therefore essential for the curing behavior and most of the mechanical properties of the cured adhesive. In certain cases it might be necessary to use mixtures of two or more (meth)acrylic esters E to obtain the desired mechanical properties.

The (meth)acrylic ester E has preferably a viscosity of less than 15 mPas measured at room temperature.

The (meth)acrylic ester E exhibits a high flash point which is higher than the one of methylmethacrylate, preferably higher than 50° C. This is advantageous in the handling of the ester E, respectively of the composition, during preparation, transport and application.

Furthermore the (meth)acrylic ester E exhibits after curing a high glass transition temperature ($T_g$). Preferably the $T_g$ is higher than 50° C. High glass transition temperature of the (meth)acrylic ester E, respectively of the composition, is advantageous because many industrial application of adhesives have an elevated working temperature. If the adhesive has a low glass transition temperature they tend to creep under load which leads to breaking of the joint.

The use of methacrylic esters such as (meth)acrylic ester E is advantageous especially if the cured adhesives need to exhibit certain levels of elasticity. It has been found that tetrahydrofurfuryl methacrylate is the most preferred (meth)acrylic ester E.

The amount of (meth)acrylic ester E is typically between 20 and 80% by weight based on the weight of the composition.

The composition further comprises at least a rubber block co-polymer RS. This rubber block co-polymer RS is solid at room temperature and is a co-polymer of styrene and butadiene and/or isoprene and/or ethylene propylene diene monomer. Due to their chemical structure these block co-polymer rubbers are referred to as "apolar" in the following.

Preferred rubber block co-polymer RS are block co-polymers of styrene and either butadiene or isoprene, such as SBS, SIS, SB or (SB2)B2, especially those which are commercially available from Kraton polymers as Kraton® grade polymers. More preferred are styrene-butadiene-styrene block co-polymer or a styrene-isoprene-styrene block co-polymer. It has been found that styrene/butadiene block co-polymers of the structure (SB2)B2 are excellently suited for the purpose of the present invention and therefore these block co-polymers are more preferred. These block co-polymers have a styrene end block and a branched rubber midblock of butadiene. Preferably these (SB2)B2 block co-polymers have an elevated content of pendant vinyl groups originating from a 1,2 addition of butadiene during polymerization. These vinyl groups are usually distributed along the rubber chain. An example of such a preferred styrene/butadiene block co-polymer is the commercial Kraton® D-KX222.

Further preferred styrene-butadiene-styrene block co-polymer are linear styrene-butadiene-styrene block co-polymer such as Kraton® D-1101.

The preferred rubber block co-polymer RS is Kraton® D-KX222 or Kraton® D-1101.

The amount of rubber block co-polymer RS is typically 1 to 40%, preferably 5 to 30%, by weight based on the weight of the composition.

The weight ratio of the rubber block co-polymer to the (meth)acrylic ester RS/E preferably is ≧15%, more preferably ≧30%, even more preferably ≧33%, most preferably 33 to 70%.

The composition further comprises a polymer PL having pending (meth)acrylic groups. This polymer PL has a molecular weight between 200 and 9000 g/mol. Typically and preferably these polymers PL are liquid or waxy at room temperature.

In one embodiment of the invention, the polymer PL is a butadiene/acrylonitrile co-polymer with terminal (meth) acrylic groups. Preferred terminal groups are acrylic groups. Examples of such polymers PL butadiene/acrylonitrile co-polymer with terminal (meth)acrylic groups are the polymers commercially available from BFGoodrich® as Hycar® VTBNX.

In another embodiment of the invention, the polymer PL is a polyurethane (meth)acrylate, obtainable by reaction of an isocyanate terminated polyurethane prepolymer with a (meth)acrylic ester comprising a hydroxy group.

By an "isocyanate terminated polyurethane prepolymer" is hereby understood any reaction product of a polyisocyanate and a polyol in the ratio of equivalents isocyanate groups to equivalents hydroxyl groups of larger than 1, i.e. also adducts of the type NCO-xx-NHCO—O-yy-O—OCONH-xx-OCN are regarded as polyurethane prepolymer in this document, wherein xx stands for a diisocyanate without NCO groups and yy stands for a diol without OH groups.

Basically any polyol OH—R—(OH)$_q$ may be used as polyol in the manufacture of isocyanate terminated polyurethane prepolymer with q≧1 and wherein R stands for a polymeric backbone with hetero atoms in the backbone or in pendent side chains. The suitability, however, is strongly influenced by the polarity of the polyol. Preferred examples for such polyols are polyols selected from the group consisting of polyoxyalkylene polyols, also called polyether polyols, polyester polyols, polycarbonate polyols and any mixtures thereof. Preferred polyols are diols, most preferred polyoxyethylenediols or polyoxypropylenediols or polyoxybutylenediols.

The polyoxyalkylene polyols may exhibit a low or high degree of unsaturation (measured according to ASTM D-2849-69 and indicated by milliequivalents unsaturation by gram of polyol (mEq/g)). Polyoxyalkylene polyols with high degree of unsaturation may be obtained for example by means of anionic catalysts such as NaOH, KOH or alcoholates of alkali. Polyoxyalkylene polyols with high degree of unsaturation may be obtained for example by means of so called Double Metal Cyanide Complex catalysts (DMC-catalysts). The use of polyoxyalkylene polyols with low unsaturation, preferably lower than 0.01 mEq/g, is preferred for polyols of the molecular weight ≧2000 g/mol.

Basically any polyisocyanate with two or more isocyanate groups may be used as said polyisocyanate in the manufacture of isocyanate terminated polyurethane prepolymer. As examples are here mentioned 2,4- and 2,6-toluoylenediisocyanate (TDI) and any mixtures thereof, 4,4'-diphenylmethanediisocyanate (MDI), any isomer of diphenylmethanediisocyanate, 1,3- and 1,4-phenylenediisocyanate, 2,3,5,6-tetramethyl-1,4-diisocyanatobenzene, 1,6-hexamethylenediisocyanate (HDI), 2-methylpentamethylene-1,5-diisocyanate, 2,2,4- and 2,4,4-trimethyl-1,6-hexamethylenediisocyanate (TMDI), 1,12-dodecamethylenediisocyanate, cyclohexane-1,3- and -1,4-diisocyanate and any mixtures of these isomers, 1-isocyanato-3,3,5-trimethyl-5-isocyanatomethylcyclohexane (=isophoronediisocyanate or IPDI), perhydro-2,4'- and -4,4'-diphenylmethanediisocyanate (HMDI), 1,4-diisocyanato-2,2,6-trimethylcyclohexane (TMCDI), m- and p-xylylenediisocyanate (XDI), 1,3- and 1,4-tetramethylxylylenediisocyanate (TMXDI), 1,3- and 1,4-bis-(isocyanatomethyl)-cyclohexane, any oligomers or polymers of the above mentioned isocyanates as well as any mixtures of mentioned isocyanates. Preferred polyisocyanates are MDI, TDI, HDI, IPDI as well as any mixtures thereof. Most preferred are MDI and TDI and their mixtures.

Polyisocyanate and polyol are reacted in known manner to yield a isocyanate terminated polyurethane prepolymer.

Said isocyanate terminated polyurethane prepolymer is reacted with a (meth)acrylic ester comprising a hydroxyl group. The hydroxyl group is part of the ester part of the molecule. Preferably the ester part has only one hydroxyl group. Preferred (meth)acrylic ester comprising a hydroxyl group is hydroxyethyl(meth)acrylate or hydroxypropyl (meth)acrylate. The two reactants are reacted in a known manner and typically in a molar excess of the (meth)acrylic ester comprising a hydroxyl group.

The preferred polyurethane (meth)acrylate is the reaction product of a TDI/polyethylene glycol polyurethane prepolymer or MDI/polyethylene glycol polyurethane prepolymer with hydroxyethyl(meth)acrylate or with hydroxypropyl (meth)acrylate.

The preparation of the polyurethane prepolymer and/or the polyurethane (meth)acrylate may be carried out in the presence of (meth)acrylic esters E in cases where (meth)acrylic esters E does not long have any functional group which is reactive to isocyanates.

In another embodiment of the invention, the polymer PL is obtainable by esterification of an alcohol ALC-II and methacrylic or acrylic acid, said alcohol ALC-II exhibiting the structural element in its chemical formula (I) or (II)

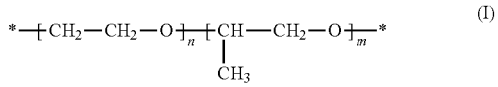

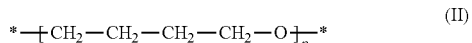

wherein m, n and p are indices and stand for values n≧0, m≧0 and n+m≧3-50 and 3≧p≧16. In those cases where n≠0 and m≠0, the ethyleneoxy and propyleneoxy segments in formula (I) are randomly distributed or arranged in blocks, depending on the preparation of these polymers.

Preferred alcohols ALC-II are polyoxyalkylenediols. Preferred polyoxyalkylendiols are polyethylene glycol or poly (ethylene/propylene) glycols or polytetramethylene ether glycol. Most preferred polyoxyalkylendiols are polyethylene glycol and polytetramethylene ether glycol. Polytetramethylene ether glycols are commercially available from BASF as PolyTHF® or from DuPont as Terathane®. It has been found that Terathane® 250 and 650 are suited well for these purposes. In certain cases also Terathane® 1000 and to a smaller extent also Terathane® 1400 may be used.

The esterification of (meth)acrylic acid with the alcohol ALC-II is performed by methods known to the person skilled in the art. Also further routes for the synthesis of said (meth) acrylic ester E are possible. For example transesterification of methylmethacrylate or methylacrylate with alcohol ALC-II in the presence of catalysts also leads to the said (meth)acrylic ester E. The details for such a transesterification are known to the person skilled in the art in this field.

Due to their chemical structure all these above mentioned polymers PL are referred to as "polar" in the following.

As mentioned before, it is known from the state of the art that solid rubbers increase the viscosity of adhesives very much. In respect to (meth)acrylates, it has been found that this is especially the case with monomers used for this invention i.e. the (meth)acrylic esters E. Also with methylmethacrylate an increase in viscosity is present, but at a much lower extent. However, when high amounts of solid rubber RS are used with non-smelling or low smelling (meth)acrylic esters E to achieve sufficient impact resistance the adhesives cannot be longer dispensed with normal application tools.

It is a key issue of the present invention that it has been found that the combination of (meth)acrylic esters E, solid rubber RS and polymer PL leads to a dramatic reduction in viscosity compared to this combination without PL. Such a reduction is unexpected and much higher than ordinary dilution effects. This phenomenon is explained by the formation of a dispersion or an emulsion.

The weight ratio RS/PL of the rubber block co-polymer RS to the polymer PL is from 1/1.5 to 5/1, preferably from 1/1 to 5/1, more preferably from 1/1 to 3/1.

It has been found that neither the combination of polar solid rubber with polar polymers PL nor the combination of apolar solid rubber RS with apolar polymers with pendant (meth) acrylic polymers show a viscosity reduction as described above. Therefore the mutual presence of a polar polymer PL and an apolar solid rubber RS is essential for the invention. Preferably the combination of E, RS and PL (E-RS-PL) has a viscosity which is lower than the viscosity of PL and at most 33%, preferably at most 10%, most preferably at most 5%, of the viscosity of a combination of E and RS (E-RS) with identical weight ratios of RS/E in both combinations E-RS-PL and E-RS. The viscosity of the combination E-RS-PL is preferably at most 50%, more preferably at most 10% of the viscosity of PL.

It is preferred that the viscosity of a combination E-RS-PL is less than 170 Pas, more preferred less than 100 Pas, most preferred less than 50 Pas enabling an easy production process and smooth application.

The composition may comprise further substances well known to the person skilled in the art such as organic or inorganic filler or thixotropic agents, stabilizers, additives, adhesion promoters, defoaming agents, thickeners, plasticizers, wetting agents, wax compounds, cross-linking agents, inhibitors, catalysts, free radical initiators etc.

Preferably the composition comprises additionally at least an organic or inorganic filler. Preferably the inorganic filler is selected from the group consisting of silica, pyrogenic silica, calcium carbonate, coated calcium carbonate, glass or ceramic beads, hollow glass or ceramic spheres and any mixtures thereof. Preferably the organic filler is a polymer fiber or polymer powder. The preferred polymers are poly(methylmethacrylate) or poly(styrene).

Furthermore preferred organic fillers are core-shell polymers. Preferred examples of such core-shell polymers are the so-called MBS polymers commercially available under the trademark Clearstrength™ from Atofina or as Paraloid™ from Rohm and Haas.

Preferred adhesion promoters are silanes, (meth)acrylic phosphates or metal (meth)acrylates, preferably exhibiting at least one (meth)acrylic group.

The composition may be cured by light or by the presence of free radicals. The free radical initiator is typically an organic peroxide, in particular benzoyl peroxide. It is preferred that also catalysts are present. Examples for such catalysts are tertiary amines and/or salts and/or complexes of transition metals. Examples for tertiary amines are N,N-dimethylaniline, N,N-dimethyl-p-toluidine, N,N-diethylaniline, N,N-diethyltoluidine, N,N-bis(2-hydroxyethyl)-p-toluidine, N-ethoxylated p-toluidine, N-alkylmorpholine or any mixtures thereof, and examples for the salts and complexes of transition metals are salts and complexes of cobalt, nickel and/or copper.

It may be advantageous to use polymerisation inhibitors such as hydrochinone, methylhydrochinone, t-butyl-p-cresol to avoid premature curing during storage of the composition.

The preparation of the composition is preferably carried out in the following manner. First the (meth)acrylic esters E and the solid rubber RS are mixed by stirring. Then the polymer PL is added by stirring to the composition in which the solid rubber has visually homogenously dissolved. Immediately a dramatic viscosity reduction may be observed. To this the further ingredients may be added.

The composition may be used as an adhesive which consists of two components. The first component A consists of or comprises a composition such as being described above. The second component B consists of or comprises at least a free radical initiator, preferably at least a peroxide, more preferably at least benzoyl peroxide. Typically both components are filled. It is preferred that both components exhibit a comparable viscosity, preferably less than 200 Pas. Further preferred both components form a paste, preferably a thixotropic paste, which are applicable by known adhesive application means.

It is further preferred that the weight ratio of the first and second components A/B is from 1/2 to 20/1, preferably from 1/1 to 15/1, more preferably from 5/1 to 15/1, most preferably about 10/1.

The adhesive is cured by mixing component A and B. The composition of the present invention is advantageous in that it is not very critical towards mixing errors. Slight variation from the recommended mixing ratio does lead only to small loss of mechanical values. Therefore the adhesive does not need perfect homogenous mixing such as other reactive systems. The mixing of the two components may be achieved by conventional mixing equipment, preferably a static mixer.

The adhesive composition is typically used in the following manner.

Components A and B are mixed to form a mixture A-B. Said mixture A-B is then applied onto a surface of a first joining material M1. Then a surface of a second joining material M2 is contacted with said mixture A-B. Finally the adhesive is cured. It is evident to the person skilled in the art, that the reaction between component A and B is starting as soon as the two components are mixed.

It may be necessary that the surfaces of the joining material M1 and/or M2 may be pre-treated by a physical, chemical and/or physicochemical method, especially in form of the application of a primer or a adhesion promoter composition.

The joining material M1 and M2 are at least in the area of contact with the mixture A-B out of a material which is selected from the group consisting of metals, glass, wood, concrete, stone, polymers. The joining materials M1 and M2 may be the same or different materials.

Another embodiment of the invention is a kit for providing a two-component reactive adhesive composition. This kit comprises two chambers K1 and K2. Said chamber K1 comprises the component A of the adhesive composition as described above and said chamber K2 comprises the component B of the adhesive as described above. The chambers may be drums, barrels or pails. The chambers are preferably arranged in such a manner that the kit represents a side-by-side cartridge or a tube-in-tube cartridge.

FIGS. 1 and 2 show schematically such preferred tube-in-tube or a side-by-side cartridge arrangements.

FIG. 1 shows a cross section through cartridges and FIG. 2 represents schematically a longitudinal section through the cartridges.

In the tube-in-tube cartridge arrangement in FIGS. 1a) and 2a) an inner tube 4 is surrounded by an outer tube 3 of the tube-in-tube cartridge 1. Preferably the tubes 3 and 4 are arranged in a concentric manner. The inner tube 4 contains chamber K2 whereas chamber K1 is located between the inner and outer tube. The tubes are closed by pistons 5 respectively 6. Piston 5 has a shape of the a disk with a hole and piston 6 is disk-like.

In the side-by-side cartridge arrangement in FIGS. 1b) and 2b) two tubes 3 and 4 forming chambers K1 and K2 are near in contact, in contact or joined. The tubes are closed by pistons 5 and 6 which are of disk-like shapes.

In both cartridge arrangements the pistons 5 and 6 are mobile and are pushed by the pistons of a caulking gun not shown in the FIGS. 1 and 2. A suitable insert may be placed between the pistons of the cartridge and those of the gun. By moving the pistons from the end into the tubes the components A and B of the adhesive composition located in the chambers K1 and K2 to are forced to be squeezed out through the openings 8 and 9 of the cartridge. The cartridges have at the dispensing end typically a thread 7 to which a static mixer may be connected. The tubes 3, 4 may be produced separately, filled individually and assembled before or after filling with the components A and B. The tubes 1, 2 may also be produced in one single piece for a example by an injection molding process. The material of the tubes is preferably aluminum or thermoplastic polymer. Thermoplastic polymer is most preferred. The thickness of the walls of the tubes depend on the adhesive properties and the material of the cartridge.

These side-by-side or tube-in-tube arrangements are preferred because they represent an easy to use application equipment which does not need a manual mixing and is therefore an ideal package for small to medium quantities, i.e. typically 20 ml up to 800 ml, for an inexperienced users. Therefore such kits may be sold in the do-it-yourself market.

For larger quantities a two component pump equipment is more adequate to use. In those cases components A and B are typically packaged in pails, drums or hobbocks.

EXAMPLES

Measuring Methods
  Viscosity: Equipment: Rheometer CV 120 hr (Bohlin Instruments), plate/plate, diameter: 25 mm, gap: 1 mm, frequency: $1\ s^{-1}$, based on ISO 6721-10
  Impact strength (IS) (Charpy):
    Equipment: Wolpert PW5,
    according to DIN 51222 without V-cut in the center of the specimen
    The values measured are indicated in $mJ/mm^2$.
  Tensile strength (TS) and Elongation at break (EAB)
    Equipment: Zwick/Roell Z005
    according to ISO 527 speed: 200 mm/min.
For the impact testing and the measurement of tensile strength the composition was cured with a paste containing 10% benzoyl peroxide, plasticizers and fillers.

Compositions

TABLE 1

Substances used.

| | | | | |
|---|---|---|---|---|
| THFMA | Tetrahydrofurfurylmethacylate | E | | |
| TMCHMA | Trimethylcyclohexylmethacrylate | E | | |
| IBMA | Isobornylmethacrylate | E | | |
| MMA | Methylmethacrylate | $E_{ref}$ | | |
| D1101 | Kraton ® D-1101 | RS | solid rubber | apolar |
| D1116 | Kraton ® D-1116 | RS | solid rubber | apolar |
| D1161 | Kraton ® D-1161 | RS | solid rubber | apolar |
| DKX222 | Kraton ® D-KX222 | RS | solid rubber | apolar |
| Nipol | Nipol ® 1072 (Zeo Chemicals) | $RS_{ref}$ | solid rubber | polar |
| PEGDMA | polyethylene glycol 1000-dimethyl-dimethacrylate | PL | liquid rubber | polar |
| VTBNX | Hycar ® VTBNX 1300X33 | PL | liquid rubber | polar |
| VTB | Hycar ® VTB 2000X168 | $PL_{ref}$ | liquid rubber | apolar |
| CTBN | Hycar ® CTBN 1300X8 | $PL_{ref}$ | liquid rubber | polar |
| L1252 | Kraton ™ L1253 Polyethylene/butene methacrylate | $PL_{ref}$ | liquid rubber | apolar |
| PBDDO | Poly bd ® R45HTLO (Atofina) Polybutadiene diol (Mw = 2000 g/mol) | | | apolar |
| PEG | polyethylene glycol 1000 (Mw = 1000 g/mol) | | | polar |
| PTE | N-ethoxylated p-toluidine | | catalyst | |

Synthesis of Polyurethane Methacrylate PU-MAc:
  200 g Polypropylene glycol (Mw=2000 g/mol) was reacted with 50 g MDI at 120° C. in nitrogen atmosphere. After 180 minutes of stirring, 28.6 g stabilized hydroxyethylmethacrylate (HEMA) was added and stirred until the amount NCO was below 0.1%. The polyurethane methacrylate formed was then cooled. Viscosity 240 Pas.
The following compositions have been formulated by using the substances shown in table 1 and the above described polyurethane methacrylate.

First the solid rubber RS or $RS_{ref}$ has been added to (meth)acrylate E or $E_{ref}$ and stirred until there was no solid rubber left at the bottom of the flask. Afterwards the polymer PL or $PL_{ref}$ as been added under stirring. Finally additional components have been added and stirred.

TABLE 2

| | | Compositions. | | | | | | | | |
|---|---|---|---|---|---|---|---|---|---|---|
| | | Ref. 1 | Ref. 3 | 1 | 2 | 3 | 4 | 5 | 6 | 7 |
| THFMA [g] | E | | 75 | 75 | 75 | 75 | 75 | 70 | 60 | 50 |
| D1101 [g] | RS | | 25 | 25 | 25 | 25 | 25 | 30 | 40 | 50 |
| PU-MAc [g] | PL | 100 | | 5 | 8 | 12.5 | 25 | 15 | 20 | 25 |
| Viscosity [Pas] | | 240 | 250 | 50 | 19 | 3 | 2 | 6 | 28 | 140 |
| solid rubber/ E [%] | | | 33 | 33 | 33 | 33 | 33 | 43 | 67 | 100 |

TABLE 3

| | | Compositions. | | | | | | | |
|---|---|---|---|---|---|---|---|---|---|
| | | Ref. 2 | Ref. 3 | 8 | 9 | 10 | 11 | 12 | 13 | 14 |
| THFMA [g] | E | | 75 | 75 | 75 | 75 | 75 | 70 | 60 | 50 |
| D1101 [g] | RS | | 25 | 25 | 25 | 25 | 25 | 30 | 40 | 50 |
| VTBNX [g] | PL | 100 | | 5 | 8 | 12.5 | 25 | 15 | 20 | 25 |
| Viscosity [Pas] | | 280 | 250 | 78 | 32 | 9 | 5 | 13 | 35 | 160 |
| solid rubber/ E [%] | | | 33 | 33 | 33 | 33 | 33 | 43 | 67 | 100 |

Table 2 and 3 show that already small quantities of PL added to a combination of E and RS strongly reduces the viscosity as compared to the viscosity of the combination E-RS and the viscosity of PL. In example 4 respectively in example 11 a reduction of a factor of 125 respectively 50 has been achieved by mixing a highly viscous Polymer to a combination E-RS in Ref.3. Furthermore table 2 and 3 show that large quantities of solid rubber may be added to the compositions without getting too viscous.

TABLE 4

| | | Compositions (cont.) | | | | | | | |
|---|---|---|---|---|---|---|---|---|---|
| | | Ref. 3 | 10 | Ref. 4 | 15 | Ref. 5 | 16 | Ref. 6 | Ref. 7 |
| THFMA [g] | E | 75 | 75 | | | | | | |
| TMCHMA [g] | E | | | 75 | 75 | | | | |
| IBMA [g] | E | | | | | 75 | 75 | | |
| MMA [g] | $E_{ref}$ | | | | | | | 75 | 75 |
| D1101 [g] | RS | 25 | 25 | 25 | 25 | 25 | 25 | 25 | 25 |
| VTBNX [g] | PL | | 12.5 | | 12.5 | | 12.5 | | 12.5 |
| Viscosity [Pas] | | 250 | 9 | 56 | 34 | 100 | 40 | 20 | 2 |
| solid rubber/E [%] | | 33 | 33 | 33 | 33 | 33 | 33 | | |
| solid rubber/$E_{ref}$ [%] | | | | | | | | 33 | 33 |

Examples Ref.8 in table 5 shows in comparison with the example 4 that the reduction of viscosity below the viscosity of E-RS combination and below the viscosity of the polymer does not occur if an apolar polymer $PL_{ref}$ is used. Furthermore example Ref.14 in table 5 show that no reduction in viscosity is observed if a polar solid rubber $RS_{ref}$ is used instead of RS.

TABLE 5

| | | Compositions (cont.) | | | | | | | | | | | | | |
|---|---|---|---|---|---|---|---|---|---|---|---|---|---|---|---|
| | | Ref. 3 | Ref. 8 | Ref. 9 | Ref. 3 | Ref. 10 | Ref. 11 | Ref. 3 | 4 | Ref. 12 | Ref. 13 | Ref. 14 | Ref. 2 | Ref. 15 | Ref. 16 |
| THFMA [g] | E | 75 | 75 | | 75 | 75 | | 75 | 75 | | | | | | |
| MMA [g] | $E_{ref}$ | | | | | | | | | | 75 | 75 | | 75 | 75 |
| VTBNX [g] | PL | | | | | | | | | | | 12.5 | 100 | | 25 |
| PU-MAc [g] | PL | | | | | | | | 25 | 100 | | | | | |
| PBDDO [g] | | | | | | 25 | 100 | | | | | | | | |
| L1253 [g] | $PL_{ref}$ | | 25 | 100 | | | | | | | | | | | |
| D1101 [g] | RS | 25 | 25 | | 25 | 25 | | 25 | 25 | | | | | | |
| D1161 [g] | RS | | | | | | | | | | | | | 25 | 25 |
| Nipol [g] | $RS_{ref}$ | | | | | | | | | | 25 | 25 | | | |
| Viscosity [Pas] | | 250 | 74 | 21 | 250 | 67 | 10 | 250 | 2 | 240 | 78 | 72 | 280 | 23 | 10 |
| solid rubber/ E [%] | | 33 | 33 | | 33 | 33 | | 33 | 33 | | | | | | |
| solid rubber/ $E_{ref}$ [%] | | | | | | | | | | | 33 | 33 | | 33 | 33 |

TABLE 6

Compositions (cont.)

|  |  | Ref. 3 | Ref. 17 | 10 | Ref. 18 | Ref. 19 | 17 | Ref. 20 | 18 | Ref. 21 | 19 |
|---|---|---|---|---|---|---|---|---|---|---|---|
| THFMA [g] | E | 75 | 75 | 75 | 75 | 75 | 75 | 75 | 75 | 75 | 75 |
| D1101 [g] | RS | 25 | 25 | 25 |  |  |  |  |  |  |  |
| D1116 [g] | RS |  |  |  | 25 | 25 | 25 |  |  |  |  |
| D1161 [g] | RS |  |  |  |  |  |  | 25 | 25 | 25 | 25 |
| DKX222 [g] | RS |  |  |  |  |  |  |  |  |  |  |
| VTBNX [g] | PL |  |  | 12.5 |  |  | 12.5 |  | 12.5 |  | 12.5 |
| VTB [g] | PL$_{ref}$ |  | 12.5 |  |  | 12.5 |  |  |  |  |  |
| Viscosity [Pas] |  | 250 | 150 | 9 | 300 | 160 | 10 | 85 | 9 | 45 | 5 |
| solid rubber/ E [%] |  | 33 | 33 | 33 | 33 | 33 | 33 | 33 | 33 | 33 | 33 |

TABLE 7

Compositions and their mechanical properties.

|  |  | Ref. 22 | Ref. 23 | 20 | 21 | 22 | 23 | 24 | Ref. 24 |
|---|---|---|---|---|---|---|---|---|---|
| THFMA [g] | E | 77 | 74 | 66 | 66 | 60 | 50 | 60 | 60 |
| D1101 [g] | RS | 22 | 25 | 22 | 22 | 26 | 33 |  |  |
| DKX222 [g] | RS |  |  |  |  |  |  | 26 | 26 |
| VTBNX [g] | PL |  |  | 11 |  | 13 | 16 | 13 |  |
| PU-MAc [g] | PL |  |  |  | 11 |  |  |  |  |
| L1253 [g] | PL$_{ref}$ |  |  |  |  |  |  |  | 13 |
| PTE [g] |  | 1 | 1 | 1 | 1 | 1 | 1 | 1 | 1 |
| solid rubber/E [%] |  | 29 | 33 | 33 | 33 | 43 | 66 | 43 | 43 |
| TS [MPa] |  | 8.2 |  | 10.4 | 9.3 | 8.2 | 6.5 | 7.8 | 3.6 |
| EAB [%] |  | 140 |  | 250 | 220 | 225 | 190 | 260 | 150 |
| IS at −20° C. [mJ/mm$^2$] |  | 3 |  | 5.5 | 6 | 8 | 12 | 9 | 9 |
| IS at 0° C. [mJ/mm$^2$] |  | 8 |  | no break | 42 | no break | no break | no break | no break |
| Remarks |  | high visc. | too high visc. | low visc. | low visc. | low visc. | low visc. | low visc. | high visc. |

Table 7 shows that the compositions 20 to 24 according to the invention exhibit a low viscosity and a high content of solid rubber, and therefore a high impact resistance, especially also at low temperatures. The composition Ref.23 with a solid rubber/E-ratio of 33% was too viscous to be mixed with the peroxide paste and therefore it was not possible to measure any mechanical values. The compositions of comparison Ref.22 and Ref.24 were very viscous. It was difficult to mix them with the peroxide paste. However, in total contrast to examples 20 to 24, it was not possible to fill such an highly viscous binder to yield an adhesive which could be applied with conventional application equipment.

TABLE 8

Highly filled compositions.

|  |  | Ref. 25 | 25 |
|---|---|---|---|
| THFMA [g] | E | 66 | 66 |
| D1101 [g] | RS | 22 | 22 |
| VTBNX [g] | PL | 11 | 11 |
| PTE [g] |  | 1 | 1 |
| Omya BSH [g] |  |  | 30 |
| solid rubber/E [%] |  | 33 | 33 |
| Viscosity [Pas] |  | 8 | 23 |

Table 8 shows that large amount of filler may be added to adhesives containing large amount of solid rubbers. Despite of the high amount of filler the composition of example 25 can be easily poured. In order to obtain a paste-like adhesive the composition of example 25 can be filled even with much more filler.

TABLE 9

Compositions and their mechanical properties

|  |  | 20 | Ref. 26 | 26 | Ref. 27 |
|---|---|---|---|---|---|
| THFMA [g] | E | 66 | 66 | 66 | 66 |
| D1101 [g] | RS | 22 | 22 | 22 | 22 |
| VTBNX [g] | PL | 11 |  |  |  |
| CTBN [g] | PL$_{ref}$ |  | 11 |  |  |
| PEGDMA [g] | PL |  |  | 11 |  |
| PEG [g] |  |  |  |  | 11 |
| PTE [g] |  | 1 | 1 | 1 | 1 |
| solid rubber/E [%] |  | 33 | 33 | 33 | 33 |
| TS [MPa] |  | 10.4 | 5.2 | 9.1 | 6.7 |
| EAB [%] |  | 250 | 10 | 190 | 32 |
| IS at −20° C. [mJ/mm$^2$] |  | 5.5 | 2.7 | 7.1 | 2.3 |
| IS at 0° C. [mJ/mm$^2$] |  | no break | 3.2 | 45.6 | 3.1 |

The invention claimed is:

1. A composition comprising
   (a) at least one (meth)acrylic ester E obtained by esterification of an alcohol ALC and methacrylic or acrylic acid, said alcohol ALC contains at least 5 carbon atoms; and (b) at least a rubber block co-polymer RS being solid at room temperature and which is a co-polymer of styrene and butadiene and/or isoprene and/or ethylene propylene diene monomer; and (c) at least a polymer PL having pending (meth)acrylic groups and which has a molecular weight between 200 and 9000 g/mol;

and wherein the polymer PL is a butadiene/acrylonitrile co-polymer with terminal (meth)acrylic groups; or a polyurethane (meth)acrylate obtained by reaction of an isocyanate terminated polyurethane prepolymer with a (meth)acrylic ester comprising a hydroxyl group wherein said isocyanate terminated polyurethane prepolymer is obtained by the reaction of a polyisocyanate and a polyol OH—R—(OH)$_q$ with q≧1 and R stands for a polymeric backbone with hetero atoms in the backbone or in pendent side chains; or is obtained by esterification of an alcohol ALC-II and methacrylic or acrylic acid, said alcohol ALC-II exhibiting the structural element in its chemical formula (I) or (II)

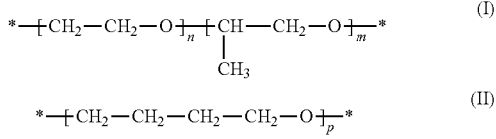

wherein n≧0, m≧0 and n+m≧3-50 and 3≧p≧16, wherein the weight ratio RS/E of the rubber block co-polymer RS to the (meth)acrylic ester E is ≧30%, the weight ratio of the rubber block co-polymer RS to the polymer RS/PL is from 1/1.5 to 5/1, and the amount of the rubber block co-polymer RS is 1 to 40% by weight based on the weight of the composition.

2. The composition according to claim 1 wherein the alcohol ALC is selected from the group consisting of tetrahydrofurfuryl alcohol, isoborneol, trimethylcyclohexanol and any mixtures thereof.

3. The composition according to claim 1 wherein the (meth)acrylic ester E is a methacrylic ester.

4. The composition according to claim 1 wherein the (meth)acrylic ester E is tetrahydrofurfuryl methacrylate.

5. The composition according to claim 1 wherein the (meth)acrylic ester E exhibits after curing a glass transition temperature T$_g$≧50° C.

6. The composition according to claim 1 wherein the (meth)acrylic ester E has a flash point ≧50° C.

7. The composition according claim 1 wherein the rubber block co-polymer RS is styrene-butadiene-styrene block co-polymer or a styrene-isoprene-styrene block co-polymer.

8. The composition according to claim 1 wherein the rubber block co-polymer RS is an (SB2)B2 co-polymer.

9. The composition according to claim 1 wherein the (meth)acrylic ester comprising a hydroxyl group is hydroxyethyl(meth)acrylate or hydroxypropyl(meth)acrylate.

10. The composition according to claim 1 wherein the alcohol ALC-II is a polyethylene glycol or a poly(ethylene/propylene) glycol.

11. The composition according to claim 1 wherein the alcohol ALC-II is a polytetramethylene ether glycol.

12. The composition according to claim 1 wherein the weight ratio RS/E of the rubber block co-polymer RS to the (meth)acrylic ester E is 33-70%.

13. The composition according to claim 1 wherein the (meth)acrylic ester E, the rubber block co-polymer RS and the polymer PL form a dispersion or a emulsion.

14. The composition according to claim 1 wherein the weight ratio of the rubber block co-polymer RS to the polymer RS/PL is from 1/1 to 3/1.

15. The composition according to claim 1 wherein the amount of the rubber block co-polymer RS is 5 to 30% by weight based on the weight of the composition.

16. The composition according to claim 1 wherein the combination of (meth)acrylic ester E, the rubber block co-polymer RS and the polymer PL (E-RS-PL) has a viscosity which is lower than the viscosity of PL; and at most 33% of the viscosity of a combination of E and RS (E-RS), with identical weight ratios of RS/E in both combinations E-RS-PL and E-RS.

17. An adhesive composition consisting of two components a first component A comprising the composition according to claim 1; and a second component B comprising at least a free radical initiator.

18. The adhesive composition according to claim 17 wherein the weight ratio of the first and second components A/B is from 1/2 to 20/1.

19. A kit for providing a two-component reactive adhesive composition comprising two chambers K1 and K2, said chamber K1 comprises component A of the adhesive composition according to claim 17 and said chamber K2 comprises component B of the adhesive composition.

20. The kit according to claim 19 wherein the chambers are drums, barrels or pails.

21. The kit according to claim 19 wherein the chambers are arranged in such a manner that the kit represents a side-by-side cartridge or a tube-in-tube cartridge.

22. A method of joining materials with the adhesive composition according to claim 17 comprising the following steps
i) mixing components A and B to form a mixture A-B,
ii) applying said mixture A-B onto a surface of a first joining material M1,
iii) contacting a surface of a second joining material M2 with said mixture A-B, and
iv) curing the mixture A-B.

23. The method according to claim 22 wherein the mixing of components A and B is performed with a static mixer.

24. The method according to claim 22 wherein the first and second joining material M1 and M2 exhibit, at least in the area of contact with the mixture A-B, a material which is selected from the group consisting of metals, glass, wood, concrete, stone and polymers.

25. A joint article being joined by the method according to claim 22.

* * * * *